United States Patent
Crisco, III

(10) Patent No.: US 8,708,825 B2
(45) Date of Patent: Apr. 29, 2014

(54) DEVICE CONTROLLER WITH CONFORMABLE FITTING SYSTEM

(75) Inventor: Joseph John Crisco, III, Barrington, RI (US)

(73) Assignee: Rhode Island Hospital, Providence, RI (US)

( * ) Notice: Subject to any disclaimer, the term of this patent is extended or adjusted under 35 U.S.C. 154(b) by 35 days.

(21) Appl. No.: 13/449,988

(22) Filed: Apr. 18, 2012

(65) Prior Publication Data

US 2012/0270655 A1     Oct. 25, 2012

Related U.S. Application Data

(60) Provisional application No. 61/478,715, filed on Apr. 25, 2011.

(51) Int. Cl.
     *A63F 9/24*          (2006.01)

(52) U.S. Cl.
     USPC .......................................................... 463/37

(58) Field of Classification Search
     CPC ................... A63F 2300/1043; A63F 2300/10; A63F 2300/1006; A63F 2300/105; G06F 3/014
     USPC ........................................................... 463/37
     See application file for complete search history.

(56) References Cited

U.S. PATENT DOCUMENTS

| | | | |
|---|---|---|---|
| 5,488,362 A * | 1/1996 | Ullman et al. | 341/20 |
| 5,581,484 A * | 12/1996 | Prince | 702/150 |
| 5,764,164 A * | 6/1998 | Cartabiano et al. | 341/22 |
| 5,823,878 A | 10/1998 | Welch | |
| 5,823,886 A * | 10/1998 | Murray | 473/213 |
| 5,930,741 A | 7/1999 | Kramer | |
| 6,243,077 B1 * | 6/2001 | Manara et al. | 345/157 |
| 6,413,190 B1 | 7/2002 | Wood et al. | |
| 6,712,692 B2 | 3/2004 | Basson et al. | |
| 6,850,224 B2 * | 2/2005 | Baughman | 345/163 |
| 7,070,571 B2 | 7/2006 | Kramer et al. | |
| 7,190,141 B1 | 3/2007 | Ashrafiuon et al. | |
| 7,313,463 B2 | 12/2007 | Herr et al. | |
| 2004/0229702 A1 | 11/2004 | Cooke | |
| 2004/0248632 A1 | 12/2004 | French et al. | |
| 2005/0046576 A1 | 3/2005 | Julian et al. | |
| 2006/0166737 A1 | 7/2006 | Bentley | |

(Continued)

OTHER PUBLICATIONS

Reinkensmeyer, D.J. et al., "Web-Based Telerehabilitation for the Upper Extremity After Stroke", IEEE, vol. 10, Issue 2, pp. 102-108, Jun. 2002.

(Continued)

*Primary Examiner* — Steve Rowland
(74) *Attorney, Agent, or Firm* — Barlow, Josephs & Holmes, Ltd.

(57) ABSTRACT

A controller with a conformable fitting system is configured for controlling a device, such as a toy or game, is pliable, flexible and cushioning to provide a custom fit of the device controller to the body part of the patient or user. The device controller spans across a joint, such as a wrist, and includes a pivot between preferably two main portions. The rotation axis of the device controller is aligned with the pivot axis of the joint to receive the physical therapy. A sensor, such as a digital encoder, is located proximal thereto to determine the relative positioning of the main portions to each other. The sensor electronically communicates with the device, such as a toy or game, to serve as a controller therefor.

12 Claims, 5 Drawing Sheets

(56) References Cited

U.S. PATENT DOCUMENTS

| | | |
|---|---|---|
| 2007/0155495 A1 | 7/2007 | Goo |
| 2007/0213126 A1 | 9/2007 | Deutsch et al. |
| 2007/0245454 A1* | 10/2007 | Eklund .................. 2/161.6 |
| 2007/0270214 A1 | 11/2007 | Bentley |
| 2007/0272010 A1 | 11/2007 | O'Leary et al. |
| 2007/0298893 A1* | 12/2007 | Yu et al. ................ 472/133 |
| 2008/0071386 A1 | 3/2008 | McBean et al. |
| 2008/0146336 A1 | 6/2008 | Feldman et al. |
| 2008/0153592 A1 | 6/2008 | James-Herbert |
| 2008/0191864 A1 | 8/2008 | Wolfson |
| 2008/0242415 A1 | 10/2008 | Ahmed |
| 2008/0248871 A1 | 10/2008 | Szturm et al. |
| 2009/0253510 A1* | 10/2009 | Sternberg et al. ............ 463/37 |

OTHER PUBLICATIONS

Shima, K., et al., "A Universal Interface for Video Game Machines Using Biological Signals", ICEC 2005, LNCS 3711, pp. 88-98, 2005 IFIP International Federation for Information Processing 2005.

"Toys and Technology for Rehabilitation in Cerebral Palsy Patients", ScienceDaily, Jul. 2, 2008.

* cited by examiner

DEVICE CONTROLLER WITH CONFORMABLE FITTING SYSTEM

CROSS REFERENCE TO RELATED APPLICATION

This application is related to and claims priority from earlier filed provisional patent application Ser. No. 61/478,715, filed Apr. 25, 2011, the entire contents thereof is incorporated herein by reference.

BACKGROUND OF THE INVENTION

The device controller with conformable fitting system relates generally to device controllers, such as toy and game controllers. More specifically, the system relates to an interface between a person, such as a child, and a game. The present invention has particular use as a tool to embrace play as a motivator for the participation in physical therapy.

It is well known in the art that the neuromuscular dysfunction can occur from a variety of causes including Cerebral Palsy (CP), stroke and trauma. Neuromuscular dysfunction results in a progressive cycle of loss of motor control, loss of function, and muscular contractures. Physical therapy has been well established as a potential benefit that can slow and even stop the progressive loss of function and the development of soft tissue contractures. However, physical therapy is usually limited to a few hours a week at an outpatient setting for most adult and pediatric populations. Outside this time, children engage in a variety of activities, of which play is the most common. Incorporating therapy into a game play encourages such therapy and makes the child more apt to participate in therapy.

There are a number of problems typically associated with prior art. Controllers for devices, namely, games are typically devices of a fixed or universal configuration. For example, an Xbox or Wii controller for video games or a hand-held remote for a radio controlled (RC) car are of a standard configuration and are not customizable to provide a fit specific to the person using it. Also, the game and toy controllers of the prior art are not well-suited for use in physical therapy because they are usually simply held in the hand and are manipulated with the fingers and, most importantly, do not span across joints. The fact that prior art controllers do not span across the user's joints and are not customizable make them poorly suited for physical therapy purposes.

In the prior art, attempts have been made to use different devices, such as toys and games, as approaches for physical therapy. This concept embraces play as a motivator for the participation in the therapy. When the prescribed therapy targets specific joints and specific motions, the toy and game controllers are typically strapped or buckled across the joint (such as a knee joint, elbow joint or wrist). In practice, these controllers resemble braces and, as result, typically have a complex and uncomfortable fitting system. This is very undesirable and can discourage child participation.

There has been little effort in the prior art to provide a device controller, namely a toy or game controller that is both customizable and well suited for physical therapy. In view of the foregoing, there is a need in the industry to make use of a child's interest in gaming as an opportunity to engage the child in physical therapy. Moreover, there is a need for a device controller that includes a conformable fitting system that has an improved interface and is well-suited for use as a toy and game controller to enable a customizable yet easily conformable fit for the patient. There is a need for such a device controller with conformable fitting system to be able to permit exercises to be carried out for physical therapy purposes. For example, the device controller, via its fitting system, must be able to span across a patient's joint, such as a wrist, to render the desired physical therapy.

SUMMARY OF THE INVENTION

The present invention preserves the advantages of prior art device controllers, such as controllers for toys and games, for providing a conformable and customized fit therefor. In addition, it provides new advantages not found in currently available device controllers and overcomes many disadvantages of such currently available device controllers.

The invention is generally directed to the novel and unique device controller, which may be used to control toys and games, for example that includes a conformable fitting system. The present invention is particularly well suited for use as a controller for toys and games. The device controller of the present invention includes a unique conformable fitting system. The device controller of the present invention provides a fitting system that is pliable and flexible to provide a custom fit of the controller to the body part of the patient or user. The controller, with its conformable fitting system, spans across a joint, such as a wrist, and includes a pivot point between preferably two main portions. The pivot point of the controller is aligned with the pivot axis of the joint to receive the physical therapy. A sensor is located proximal thereto to determine the relative positioning of the main portions to each other. The sensor electronically communicates with the device, such as a toy or game, to serve as a controller therefor.

It is therefore an object of the present invention to provide a new and novel device controller with a conformable fitting system.

It is also an object of the present invention to provide a new and novel device controller with a conformable fitting system.

Another object of the present invention is to provide a conformable device controller with a fitting system that is well suited for use as a toy or game controller.

Another object of the present invention is to provide a device controller with a conformable fitting system that is customizable.

Yet another object of the present invention is to provide a device controller with a conformable fitting system that is comfortable to the user.

A further object of the present invention is to provide a device controller with a conformable fitting system that has an improved interface to make using the controller more enjoyable to encourage its use for physical therapy.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
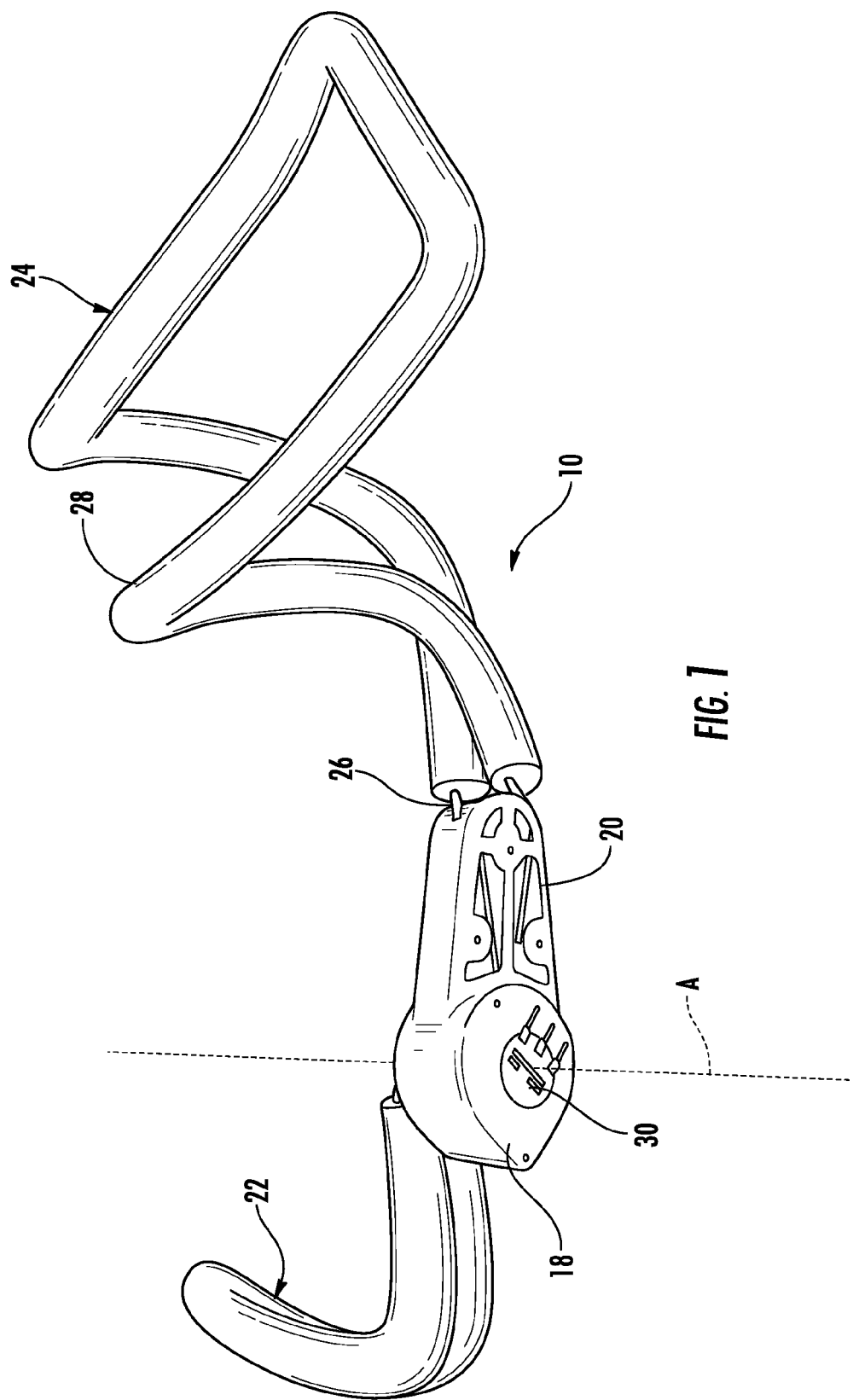
FIG. 1 is a front view of the device controller of the present invention employing the conformable fitting system of the present invention.

As seen on the attached figures, the present invention is well suited to serve as an interface between a patient 14 and a device 12, such as a toy or game. It should be understood that the device controller 10 can be used in connection with and adapted to any device 12 and is not limited to use with a toy or game device 12. The invention herein will be described in connection with the user 14 in connection with a toy or game device 12 but the controller 10 of the present invention is not intended to be limited to such a type of device 12.

The controller 10 of the present invention promotes specific relative joint movements by providing physical therapy through play. The present invention elicits specific relative joint movements, such as wrist extension and forearm supination, two joint movements that are commonly affected by muscular contractures. The benefit of a toy or game device 12 that can also provide physical therapy through a unique controller 10 is that it can engage a child user 14 for long periods of time, thus increasing the time the child user 14 is actually receiving therapy. The controller 10 may be adapted to other types of devices 12 that may be of interest to other types of patients 14. Therefore, a key aspect of the present invention is to provide a conformable device controller 10 but also one that is easily customized to the patient 14.

By way of example, as seen in the drawings, the controller 10 of the present invention is shown used in connection with a toy device 12 that is in the form of a radio controlled (RC) car. It should be understood that this is just one example of the toy or game with which the controller 10 and fitting system of the present invention can be used. In general, it is preferred the device 12 to be controlled is one that is electronically controlled. RC cars and their controllers are so well known in the art that they need not be discussed in detail herein. Generally, for example, a radio controlled (RC) car wirelessly receives signals from a hand held controller, which correspond to actions that the user would like the car to take. For example, the physical press of a certain button on the hand held remote causes the car to go forward while the physical press of another button causes the car to turn to the right and another causes the car to the turn to the right, and the like. Each button triggers the transmission of a distinct signal to cause the car to act as desired.

The device controller 10 of the present invention similarly transmits a desired signal 16, either wirelessly or via wire 34, to a device 12 so that device carries out the desired corresponding action. The transmission of such a signal 16 is triggered not by a button press but by the patient 14 moving one body part 14a relative to another body part 14b. The resultant relative movement is sensed and the appropriate signal 16 is transmitted as a result. Thus, the controller 10 of the present invention converts a physical action into an electrical signal 16 for appropriate use in a device 12, such as a toy or game.

Figure 2:
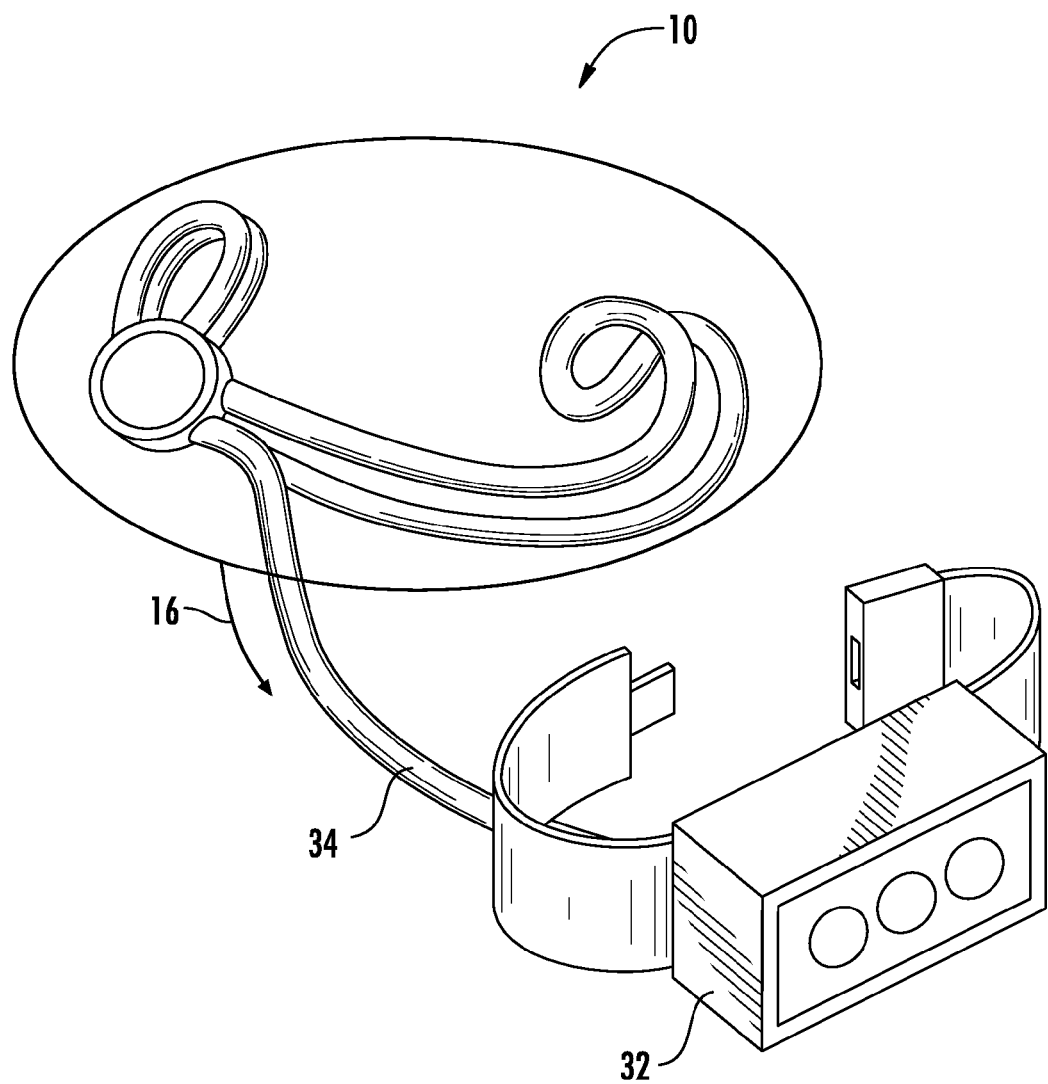
FIG. 2 is a perspective view of a sketch of the device controller of the present invention illustrating its modularity.

Turning first to FIGS. 1 and 2, details of the construction of the controller 10 of the present invention is shown. The device controller 10 employs a unique conformable fitting system. As best seen in FIG. 1, a first housing 18 is movably connected to a second housing 20. Preferably, the first housing 18 is rotationally connected to the second housing 20 about axis A. This is just one, but preferred, configuration of the movable connection of the first housing 18 to the second housing 20. For example, although not shown, the first housing 18 may be hingedly connected to second housing 20. Still further, the first housing 18 may be linearly connected to the second housing 20. These alternative configurations may be employed for other type of body movement.

Emanating from the first housing 18 is a first conformable member 22 while a second conformable member 24 emanates from the second housing 20. It is preferred that both of the first conformable member 22 and the second conformable member 24 can conform about a body part 14a, 4b of the user/patient, can be easily moved into place, will stay in place after positioned and have cushioning therein for added comfort. Preferably, the first conformable member 22 and the second conformable member 24 each have a bendable member core 26, which is preferably made of a malleable or pliable metal, such as sculpting wire. Any other type of material can be employed as the member core 26 to provide this function. One or both of the members 22, 24 can be conformable as in certain situations this may be more desirable for the patient 14.

While the member core 26 is bendable, it is preferred that, once bent, it stays in place, namely, in the desired position about a body part 14a, 14b of the user 14. A layer of soft cushioning foam 28 is also preferably provided for added comfort for the patient/user. Such cushioning foam 28 may be a sleeve of foam that is slid over the member core 26. Alternative constructions of the first conforming member 24 and the second conforming member 26 are envisioned. For example, the cushioning layer 28 may be soft rubber or plastic that is deposited or overmolded about the member core 26. Such alternative constructions are considered within the scope of the present invention.

As seen in FIG. 1, the first conformable member 22 and the second conformable member 24 have been positioned into place and stay at that location until later moved. It is preferred, although not required, that the first conformable member 22 and the second conformable member 24 form a loop that can be custom formed into any shape desired. Such a loop shape enables a wide array of shapes to be formed for each of the conformable members 22, 24. Also, it is possible that the conformable members 22, 24 can be each single linear members instead of loops. Thus, the length, size and configuration of the conformable members 22, 24 can be modified to suit the patient 14 and application at hand. Fitting of the controller 10 to a patient 14 will be shown in detail and discussed in connection with FIGS. 4 and 5 below.

Referring back to FIG. 1, a sensor 30 is positioned to sense the movement of the first housing 18 relative to the second housing 20 and thus the movement of a first body part 14a relative to a second body part 14b respective secured within the first conformable member 22 and the second conformable member 24. In the preferred embodiment shown in the FIG. 1, a rotation sensor 30, in the form of a digital encoder, is placed at the axis A of rotation of the first housing 18 and the second housing 20. Rotational digital encoders are very well known in the art but, generally, they include an array of contacts or indicia on one surface that are exposed to a detector (not shown). As a result, the position of the first housing 18 relative to the second housing 20 can be determine and then translated to a electrical signal 16 with a given value. This signal 16 could be voltage or a digitally encoded signal. The range and gain of the sensor 30, triggered by the movement of the first housing 18 and the second housing 20 related to each other from body movement, for calibration and fine-tuning.

As seen in FIG. 2, a wired connection from the sensor encoder 30 is provided to route the desired positional value of the first housing 18 and the second housing 20 to a transmission unit 32. The transmission unit 32 is either wirelessly or connected by wire 34 to the device 12 to be controlled, such as a game or toy. The transmission unit 32 may be attached to the user's belt or about their waist, for example. It is also possible that the transmission unit 32 is miniaturized and incorporated directly into the controller 10 itself.

In connection with FIGS. 3 and 4, installation and use of the controller 10 with fitting system of the present invention will be shown and described in connection with a controller 10 that spans across a wrist joint 36, which is the preferred configuration and use of the present invention. The controller 10 with the conformable fitting system of the present invention also permits varying the orientation and location of the invention such that various single directions of joint 36, such as wrist, motion or simultaneous multiple directions of wrist motions can be sensed. It should be understood that a controller 10 for a different part of the body and other joints would be installed and used in a very similar or analogous fashion. It is envisioned that the present invention can be installed about any joint or body part.

Figure 3:
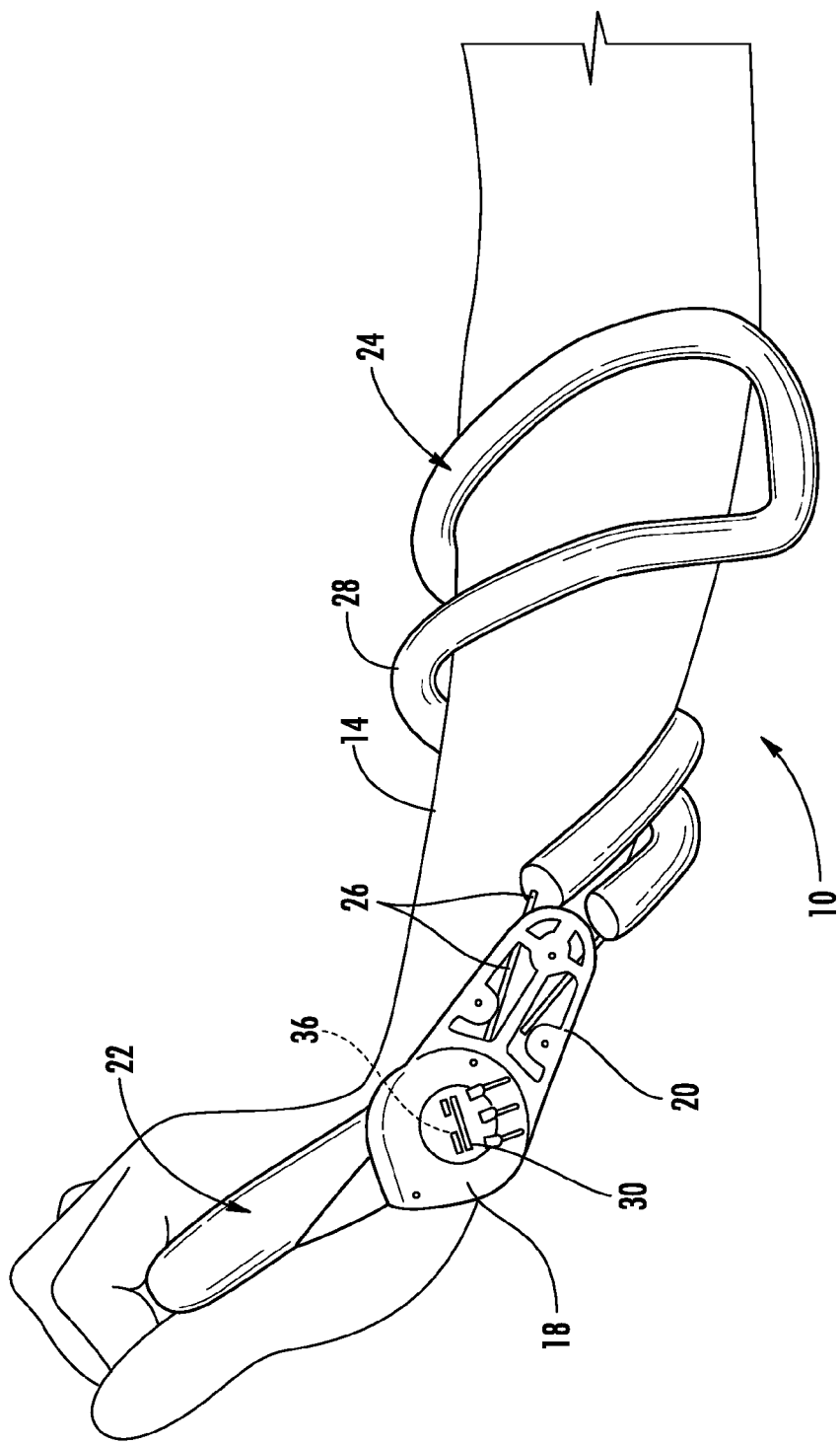
FIG. 3 is a side view of the device controller of the present invention installed on a patient and custom fit thereto using the conformable fitting system of the present invention.
Figure 4:
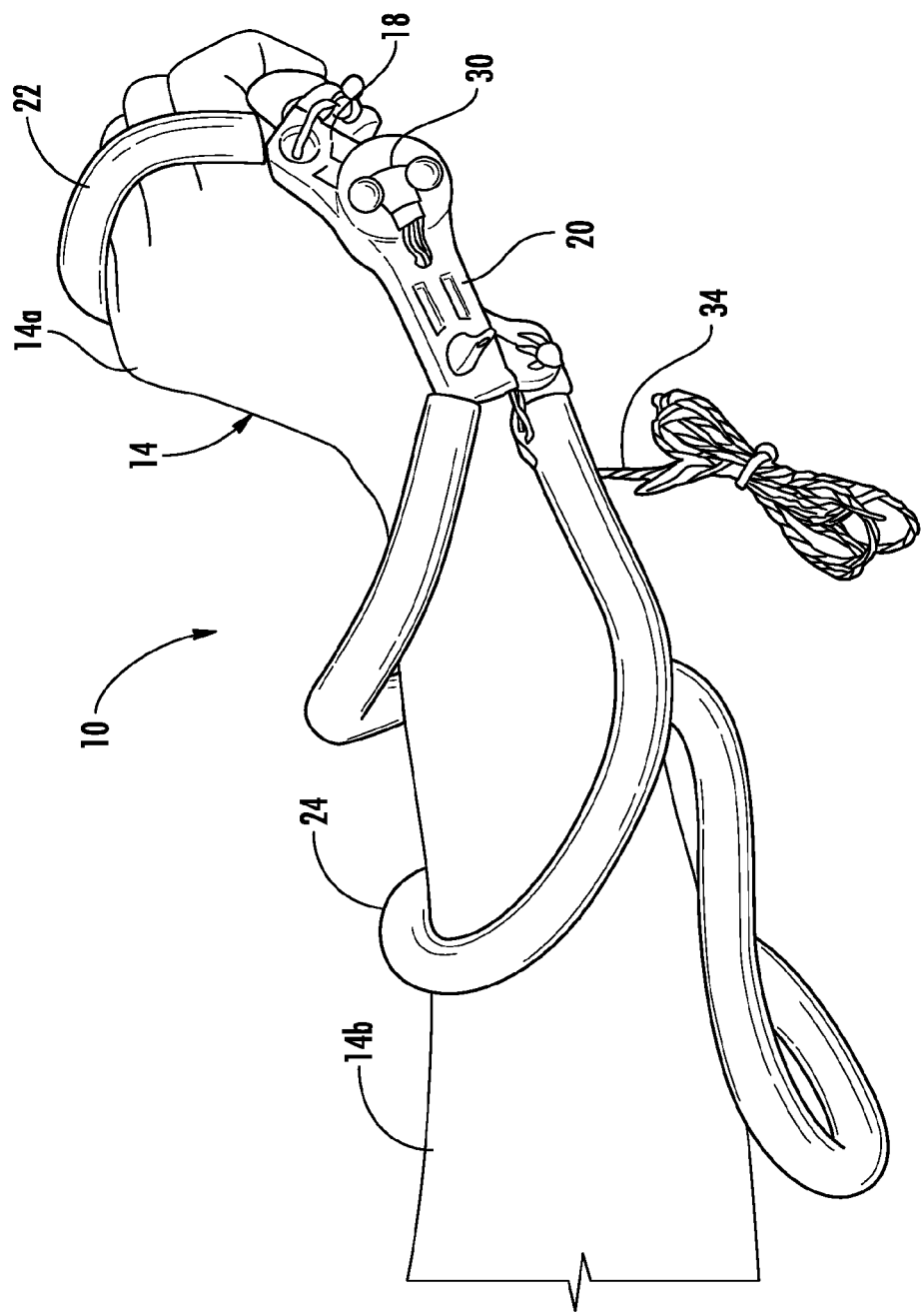
FIG. 4 is a rear perspective view of the device controller installed on a patient of FIG. 4.

In FIGS. 3 and 4, and example installation is shown for treatment of wrist joint 36 of a patient. For wrist treatment, the sensor 30 is placed at the rotation point of the wrist with one conformable members 24 secured to one housing 20 and the forearm 14b of the patient 14 secured with the users 14 hand 14a secured to conformable member 22 and housing 18. The conformable members 22, 24 can be shaped as desired to carry this out. In this example, the first conformable member 22 is preferably bent and positioned into an "L" shape to enable it to sit proximal to the palm of the patient 14 for easy gripping. The second conformable member 24 is bent to spiral about the forearm 14b of the patient 14 to secure it in place. Uniquely, the conformable members 22, 24 can be adjusted and moved as needed to provide a custom fit to the specific patient 14 being fitted for the device controller 10. FIG. 3 shows one type of wrapping configuration of the device 10 while FIG. 4 shows a slightly modified configuration to best suit the patient 14. The malleable member 26, such as a wire, with foam cover 28 is bent and conformed in place thereon while ensuring that it is snug enough to avoid slippage yet still being loose enough for comfort for the patient 14.

Regardless of the configuration, the rotational sensor 30 is fixedly located through an axis A of rotation of the wrist joint 36. As a result, physical rotational location of the wrist can be translated to a value, which can be used by a device 12, such as a toy or game.

The above described installation of the device controller 10 of the present invention preferably includes two housings 18, 20, one located on one side of a joint 36 and another located on the other side of the joint 36 for purposes of treating that joint 36. It is possible that multiple joints may be treated in a single device controller 10 of the present invention (not shown). A larger controller 10 can be provided with more one sensor 30 and more than two conformable members 22, 24 to respectively secure to more than two body parts 14a, 14b. For example, an entire leg controller is possible with a sensor 30 located at the knee and ankle with conformable members at the thigh, shin and foot. In this example, the sensor 30 at the knee can provide a first signal corresponding to knee movement while a second sensor at the ankle can provide a second signal corresponding to ankle movement.

Figure 5:
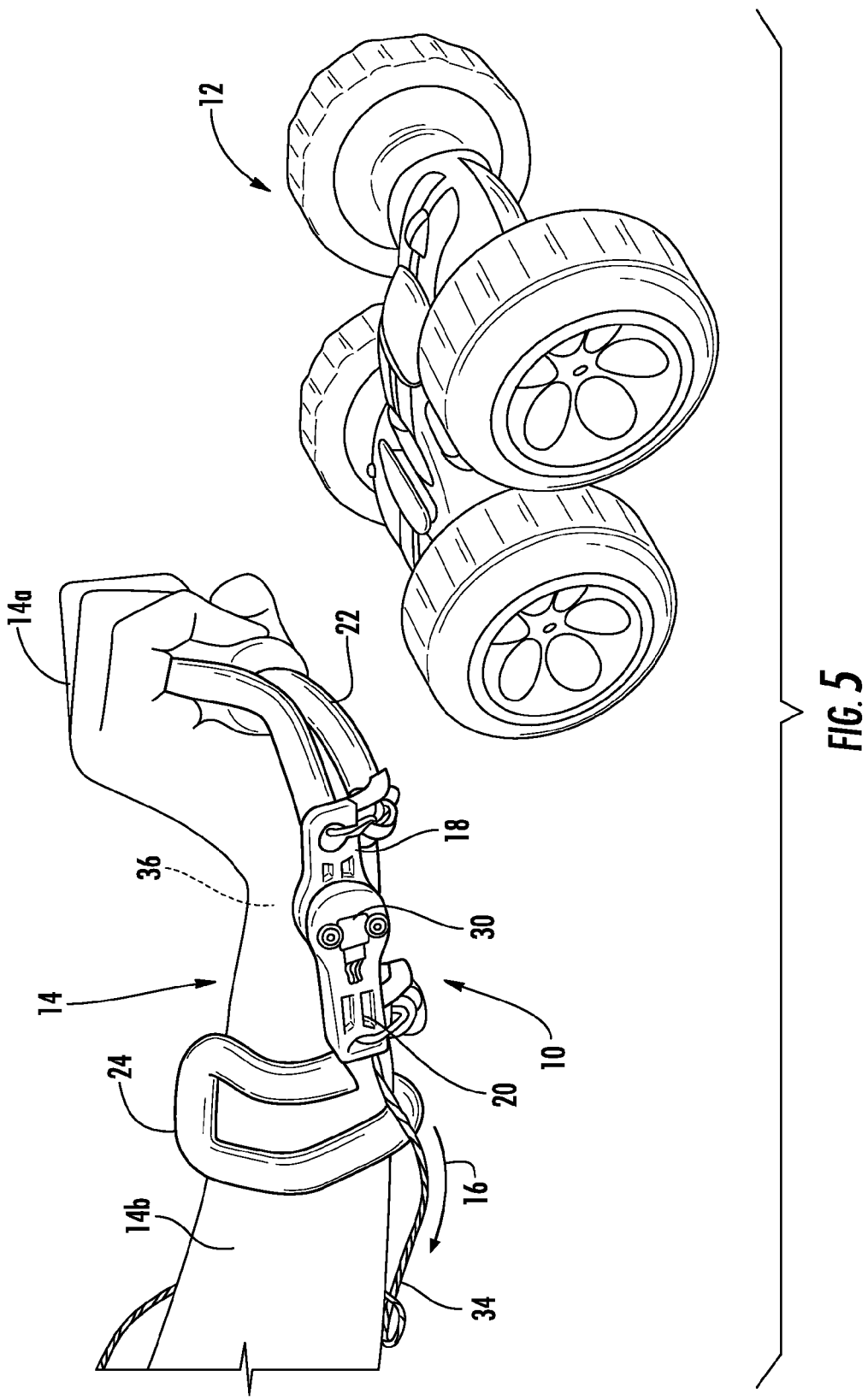
FIG. 5 is a perspective view of the device controller of the present invention in the process of controlling a device, namely a toy or game.

Turning now to FIG. 5, use of the controller 10 of the present invention, using the conformable fit system, provides a custom fit to a patient 14 to control a device 12 in similar fashion to a RC car. In this example, the controller 10 is shown used to control a toy vehicle. For example, movement of the hand 14a about the wrist joint 36, in turn, rotates the first housing 18 relative to the second housing 20 to send rotational data via signal 16 over wire 34 to the toy vehicle device 12. That rotational data is be translated, using the appropriate software, to software instructions to control the speed of the vehicle device 12. For example, more rotation of the wrist 14a upwardly causes the vehicle device 12 to travel faster. Opposite movement of the wrist 14a downwardly can be programmed to cause the vehicle device 12 to travel slower. Any desirable control of the game or toy device 12 can be carried out using the controller 10 of the present invention.

It would be appreciated by those skilled in the art that various changes and modifications can be made to the illustrated embodiments without departing from the spirit of the present invention. All such modifications and changes are intended to be covered by the appended claims.

What is claimed is:

1. A controller for controlling a device by a user, comprising:
   a first housing;
   a first member connected to the first housing; the first member being conformable about a first body part of a user; the first member including a first bendable member core and a first cushioning outer layer surrounding the bendable member core; the first bendable member core being made of metal; the first member directly encircling the first body part of the user;
   a second housing movably connected to the first housing;
   a second member connected to the second housing; the second member being conformable about a second body part of the user; the second member including a second bendable member core and a second cushioning outer layer surrounding the bendable member core; the second member directly encircling the second body part of the user; and
   whereby movement of the first body part of the user relative to the second body part of the user moves the first housing relative to the second housing.

2. The controller of claim 1, further comprising:
   means for sensing and measuring movement of the first housing relative to the second housing.

3. The controller of claim 2, further comprising:
   means for outputting a value corresponding a position of the first housing relative to the second housing to a device.

4. The controller of claim 1, wherein the second bendable member core is made of metal.

5. The controller of claim 1, wherein the first cushioning outer layer is made of foam.

6. The controller of claim 1, wherein the second cushioning outer layer is made of foam.

7. The controller of claim 3, wherein the device is a toy.

8. The controller of claim 3, wherein the device is a game.

9. The controller of claim 3, wherein the value is configured for use by a game system.

10. The controller of claim 3, wherein the value is configured for use by a toy system.

11. The controller of claim 2, wherein the means for sensing and measuring movement of the first housing relative to the second housing is a digital encoder.

12. The controller of claim 1, wherein the first housing and the second housing are rotationally connected to each other.

* * * * *